Patented Apr. 23, 1946

2,399,068

UNITED STATES PATENT OFFICE 2,399,068

UNSATURATED 5-AMINO-1,3-DIOXANES AND PREPARATION THEREOF

Murray Senkus, Terre Haute, Ind., assignor to Commercial Solvents Corporation, Terre Haute, Ind., a corporation of Maryland No Drawing. Application May 17, 1943, Serial No. 487,336

13 Claims. (Cl. 260—338)

My invention relates to new and useful amino acetals of unsaturated aldehydes and to a process for preparing the same. More particularly, it concerns 5-amino-1,3-dioxanes of the class:

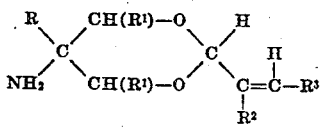

in which R may be either hydrogen, alkyl, or alphahydroxyalkyl; $R^1$ represents hydrogen, alkyl, aryl or furyl; $R^2$ is hydrogen, aryl or alkyl; and $R^3$ is aryl or alkyl, the substituents $R^2$ and $R^3$ representing the following combinations of groups and no others: hydrogen and aryl, alkyl and alkyl, alkyl and aryl, and aryl and aryl.

5-amino-1,3-dioxanes included by the above formula are: 5-amino-5-methyl-2-(1-methylstyryl)-1,3-dioxane, 5-amino-5-ethyl-2-(1-methyl-1-butenyl)-1,3-dioxane, 5-amino-5-methyl-2-(1-phenylstyryl)-1,3-dioxane, 5-amino-5-hydroxymethyl-2-(1-ethyl-1-pentenyl)-1,3-dioxane, 5-amino-5-ethyl-2-(1-ethyl-1-pentenyl)-1,3-dioxane, 5-amino-2-(1-ethylstyryl)-1,3-dioxane, 5-amino-5-hydroxymethyl-2-styryl-1,3-dioxane, and the like.

Ordinarily, when compounds containing both nitro groups and olefin functions are catalytically hydrogenated at elevated temperature and pressure both groups become hydrogenated. Contrary to this, however, I have found that no reduction occurs at the double bonds of certain 5-nitro-1,3-dioxanes when the groups represented by the substituents $R^2$ and $R^3$ are both alkyl, both aryl, the first hydrogen and the second aryl, or the first alkyl and the second aryl. This discovery is considered all the more surprising inasmuch as hydrogenation of the double bond does occur under identical conditions when both $R^2$ and $R^3$ represent hydrogen or when $R^2$ is hydrogen and $R^3$ is alkyl.

5-amino-1,3-dioxanes of the above described type are prepared by the liquid-phase catalytic reduction of the corresponding nitro compounds. This hydrogenation process is carried out at elevated pressures, and preferably at elevated temperatures, although with the proper catalyst, reduction can occur at a temperature of from about 25 to 30° C. Generally, it will be found advantageous to effect the reduction in the presence of a suitable solvent such as the lower aliphatic alcohols, for example, methanol or ethanol. Hydrogen pressures ranging from between approximately 500 and 2000 pounds per square inch and temperatures of from about 25 to 125° C. may be utilized. Ordinarily pressures of from 1000 to 1500 pounds per square inch, and temperatures of from about 30 to 70° C. will be found most desirable. The catalyst employed may be any of a number of well-known hydrogenation catalysts which are active within the above-mentioned temperature range. For the most part, however, I prefer to employ Raney nickel, usually in a ratio of about 10 grams of catalyst per mole of 5-nitro-1,3-dioxane to be reduced. Any of several different designs of hydrogenation apparatus may be employed with substantially identical results, in carrying out my invention. Accordingly, it should be understood that the present invention is in no way related to, or dependent upon a particular design of hydrogenation apparatus.

Completion of the reduction is evidenced by the failure of additional hydrogen to be absorbed. When this stage of the process is reached, the mixture containing the crude unsaturated 5-amino-1,3-dioxane is withdrawn from the hydrogenation unit and the catalyst separated from the mixture by filtration or other convenient means. The filtrate, thus obtained, may then be subjected to fractional distillation under reduced pressure to remove the solvent. The residue secured in this manner consists chiefly of the unsaturated 5-amino-1,3-dioxane, and for the majority of technical uses is sufficiently pure. Further purification may be readily effected by careful fractionation under reduced pressure, or if the compound obtained is a solid, it may be purified by recrystallization from a suitable solvent, such as a lower aliphatic alcohol, ether or benzene.

The unsaturated 5-nitro-1,3-dioxanes utilized in the preparation of these new compounds may be conveniently synthesized in accordance with the procedures described and claimed in my co-pending application, U. S. Serial No. 487,335, filed May 17, 1943. By the procedure there described, approximately equimolecular proportions of a polyhydroxy nitro compound and the desired unsaturated aldehyde are heated in the presence of an acid catalyst such as benzenesulfonic acid and if desired, in the presence of an organic liquid, such as benzene or toluene, which is capable of removing the water produced during the reaction in the form of a constant boiling mixture. This particular reaction has been found to be very general in character and may be effected between substantially any unsaturated aldehyde and a polyhydroxy nitro compound of the type herein disclosed. Suitable aldehydes for this reaction are cinnamic aldehyde, α-ethyl-β-propylacrolein, α-methylcinnamic aldehyde, α-ethylcinnamic aldehyde, α-phenylcinnamic aldehyde, α-methyl-β-ethylacrolein, α-ethyl-β-methylacrolein, and the like. As examples of suitable polyhydroxy nitro compounds, there may be mentioned, tris(hydroxymethyl)-nitromethane 2-nitro-1,3-propanediol, 2-propyl-2-nitro-1,3-propanediol, 2,8-dimethyl-5-nitro-4,6-nonanediol, 1,3-diphenyl-2-nitro-1,3-propanediol, 1,3-difuryl-2-nitro-1,3-propanediol, 2-nitro-2-methyl-1,3-propanediol, 2-nitro-2-ethyl-1,3-propanediol and the like.

My invention may be further illustrated by the following specific examples:

Example I 5-amino-5-ethyl-2-(1-methyl-1-butenyl)-1,3-dioxane was prepared by dissolving 229 parts of 5-nitro-5-ethyl-2-(1-methyl-1-butenyl)-1,3-dioxane in 500 parts of ethanol. This solution was then hydrogenated in the presence of 10 parts of Raney nickel at a temperature of 45–50° C., and under a pressure of 1000 pounds per square inch. The resulting 5-amino-5-ethyl-2-(1-methyl-1-butenyl)-1,3-dioxane was obtained in a conversion of 50 per cent and boiled at 126–129 (10 mm.). The specific gravity $(d_{20}^{20})$ of this product was 0.9831 and its refractive index $(n_D^{20})$ was 1.4742. Analysis: Calculated for $C_{11}H_{21}NO_2$—N, 7.03; found—N, 6.90.

In order to definitely ascertain the structure of the amino acetal thus produced, 15 grams of the latter was dissolved in 128 grams of 8 per cent sulfuric acid and the solution allowed to stand overnight. This treatment caused the acetal to hydrolyze into the original aminohydroxy compound and an aldehyde. The latter rose to the top in the form of an oil and was separated, dried over sodium sulfate and distilled. This product boiled at 134–136° C. (750 mm.) as compared to the corresponding saturated aldehyde, 2-methyl-valeraldehyde, which boils at 116° C. (750 mm.). This proved conclusively that the unsaturated side chain in the original nitroacetal had not been effected by hydrogenation.

Example II

One hundred forty parts of 5-nitro-5-ethyl-2-(1-ethyl-1-pentenyl)-1,3-dioxane, 300 parts of methanol, and 5 parts of Raney nickel catalyst were placed in a suitable hydrogenation unit and sealed. This mixture was then subjected to hydrogenation at a pressure of 1500 lbs. per square inch for a period of three hours at a temperature of between 60–70° C. Throughout the hydrogenation step, the mixture was constantly agitated. After absorption of hydrogen had ceased, the reaction mixture was removed from the apparatus, the catalyst separated from the solution by filtration and the methanol removed from the filtrate by fractional distillation. The 5-amino-5-ethyl-2-(1-ethyl-1-pentenyl)-1,3-dioxane obtained in this manner amounted to 80 parts and boiled at 105–108° C. (1 mm.). The product was a colorless, odorless, mobile liquid, and was soluble in methanol, ether and benzene, but insoluble in water. Analysis: Calculated for $C_{13}H_{25}NO_2$—N, 6.17; found—N, 6.22. The method employed in determining the structure of the hydrogenated nitroacetal was essentially the same as that used in Example I. The aldehyde thus obtained boiled at 173° C. (750 mm.), which is the boiling point of α-ethyl-β-propylacrolein. There was no possibility of any of the corresponding saturated aldehyde, 2-ethyl-hexaldehyde, being present, since the latter boils at 163° C. under the same conditions.

Example III

Two hundred forty-nine parts of 5-nitro-5-hydroxymethyl-2-styryl-1,3-dioxane was dissolved in 800 parts of methanol, and the resulting mixture hydrogenated in the presence of 10 parts of Raney nickel at a temperature of 30° C., and under a pressure of 1200 lbs. per square inch. After hydrogenation was complete, the mixture was withdrawn from the apparatus, the catalyst removed by filtration and the methanol separated from the mixture by distillation. The crude product left as a residue solidified on cooling and was purified by recrystallization from water. The 5-amino-5-hydroxymethyl-2-styryl-1,3-dioxane, thus obtained, melted at 149.5° C. and was produced in a conversion of 80 per cent. It was found to be soluble in methanol, acetone and hot water, but only slightly soluble in benzene and cold water. Analysis: Calculated for $C_{13}H_{17}NO_2$—N, 5.96; found—N, 5.97.

In determining the structure of the resulting amino acetal, the aldehyde was liberated in accordance with the procedure given in Example I, after which its phenylhydrazone was prepared. This derivative melted at 168° C., the melting point of the phenylhydrazone of cinnamaldehyde.

The unsaturated 5-amino-1,3-dioxanes of the present invention have been found to be useful as intermediates in the preparation of insecticide compositions, and surface active agents. They are likewise useful as intermediates in the preparation of numerous useful organic compounds. Other uses of these materials will readily occur to those skilled in the art.

My invention now having been described, what I claim is:

1. 5-amino-1,3-dioxanes, having the structural formula:

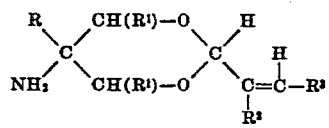

wherein R represents a member of the group consisting of hydrogen, alkyl and α-hydroxyalkyl; $R^1$ is a member of the group consisting of hydrogen, alkyl, aryl and furyl; $R^2$ is a member of the group consisting of hydrogen, aryl and alkyl; and $R^3$ is a member of the group aryl and alkyl, the substituents $R^2$ and $R^3$ representing the following combinations of groups and no others: hydrogen and aryl, alkyl and alkyl, alkyl and aryl, and aryl and aryl.

2. 5-amino-5-ethyl-2-(1-methyl-1-butenyl)-1,3-dioxane.

3. 5-amino-5-ethyl-2-(1-ethyl-1-pentenyl)-1,3-dioxane.

4. 5-amino-5-hydroxymethyl-2-styryl-1,3-dioxane.

5. In a process for the direct hydrogenation of unsaturated 5-nitro-1,3-dioxanes to the corresponding 2-vinyl substituted 5-amino-1,3-dioxanes, said 5-nitro-1,3-dioxanes having the general formula:

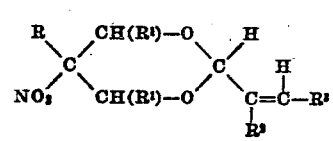

in which R is a member of the group consisting of hydrogen, alkyl and α-hydroxyalkyl; $R^1$ is a member of the group consisting of hydrogen, alkyl, aryl and furyl; $R^2$ is a member of the group consisting of hydrogen, aryl and alkyl; and $R^3$ is a member of the group consisting of aryl and alkyl, the substituents $R^2$ and $R^3$ representing the following combinations of groups and no others: hydrogen and aryl, alkyl and alkyl, alkyl and aryl, and aryl and aryl; the step which comprises subjecting said unsaturated 5-nitro-1,3-dioxane to hydrogenation in the liquid phase in the presence of a hydrogenation catalyst at a temperature of between about 25 and 125° C. and at a pressure of between approximately 500 and 2000 pounds.

6. In a process for the direct hydrogenation of unsaturated 5-nitro-1,3-dioxanes to the corresponding 2-vinyl substituted 5-amino-1,3-dioxane, said 5-nitro-1,3-dioxane having the general formula:

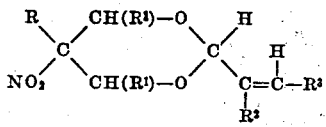

in which R is a member of the group consisting of hydrogen, alkyl and α-hydroxyalkyl; $R^1$ is a member of the group consisting of hydrogen, alkyl, aryl and furyl; $R^2$ is a member of the group consisting of hydrogen and alkyl; and $R^3$ is a member of the group consisting of aryl and alkyl, the substituents $R^2$ and $R^3$ representing the following combination of groups and no others: hydrogen and aryl, alkyl and alkyl, alkyl and aryl, and aryl and aryl; the step which comprises subjecting said unsaturated 5-nitro-1,3-dioxane to hydrogenation in the liquid phase in the presence of Raney nickel at a temperature of between about 30 and 70° C. and under elevated pressure.

7. In a process for the preparation of 5-amino-5-ethyl-2-(1-methyl-1-butenyl)-1,3-dioxane by means of the direct hydrogenation of 5-nitro-5-ethyl-2-(1-methyl-1-butenyl)-1,3-dioxane, the step which comprises subjecting the latter to hydrogenation in the liquid phase in the presence of a hydrogenation catalyst at a temperature of from between approximately 25 and 125° C. and under elevated pressure.

8. A process for the preparation of 5-amino-5-ethyl-2-(1-ethyl-1-pentenyl)-1,3-dioxane by means of the direct hydrogenation of 5-nitro-5-ethyl-2-(1-ethyl-1-pentenyl)-1,3-dioxane, the step which comprises subjecting the latter to hydrogenation in the liquid phase in the presence of a hydrogenation catalyst at a temperature of between about 25 and 125° C. and at elevated pressure.

9. A process for the preparation of 5-amino-5-hydroxymethyl-2-styryl-1,3-dioxane by means of the direct hydrogenation of 5-nitro-5-hydroxymethyl-2-styryl-1,3-dioxane, the step which comprises subjecting the latter to hydrogenation in the liquid phase in the presence of a hydrogenation catalyst at a temperature of between about 25 and 125° C. and at elevated pressure.

10. The process of claim 5 in which the hydrogenation catalyst is Raney nickel.

11. The process of claim 7 in which the hydrogenation catalyst is Raney nickel and the temperature range is between approximately 30 and 70° C.

12. The process of claim 8 in which the hydrogenation catalyst is Raney nickel and the temperature range is between about 30 and 70° C.

13. The process of claim 9 in which the hydrogenation catalyst is Raney nickel and the temperature range is between about 30 and 70° C.

MURRAY SENKUS.